United States Patent Office 3,849,553
Patented Nov. 19, 1974

3,849,553
CYCLIC NUCLEOTIDE THERAPEUTIC
PREPARATION
Frank J. Dea, Fullerton, and Eric L. Nelson, Santa Ana,
Calif., assignors to Nelson Research & Development
Company, Irvine, Calif.
No Drawing. Filed Sept. 4, 1973, Ser. No. 393,715
Int. Cl. A61k 27/00
U.S. Cl. 424—180     9 Claims

ABSTRACT OF THE DISCLOSURE

A method for treating psoriasis in humans comprising the administration to a human suffering from psoriasis of an effective dose for treating psoriasis of a compound of the formula

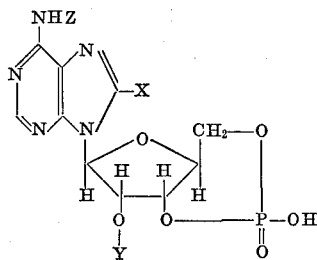

where Y and Z are each selected from the group consisting of H or butyryl and X is selected from the group consisting of H, —Br, —$SCH_3$, —SH, —OH and —$NH_2$, or a pharmaceutically acceptable addition salt provided that X, Y and Z are not all H.

BACKGROUND OF THE INVENTION

Field of the Invention

The present invention relates to the therapeutic use of certain cyclic nucleotide derivatives. More particularly the present invention relates to the use of certain cyclic nucleotide derivatives in the treatment of skin conditions such as psoriasis.

Background of the Prior Art

During the last few years, the biological role of cyclic 3',5'-adenosine monophosphate (cyclic AMP or cAMP) has been the subject of a great number of studies. Cyclic AMP appears to be involved in the regulation of function and metabolism of a large variety of tissues and has been identified as a "second messenger" in the concept of hormone action by Sutherland (*Harvey Lectures*, 57, 17, (1962); *Circulation*, 37, 279 (1968)). Analogues and derivatives of cyclic AMP are also known, e.g. U.S. Pat. No. 3,712,885 and U.S. Pat. No. 3,627,753. It is also known that body enzymes, known as phosphodiesterases, inactivate cyclic AMP by converting it to 5'-adenosine monophosphate. However, many of the derivatives of cAMP are resistant to the effect of these enzymes. In general, see Robinson et al., *Cyclic AMP*, Academic Press, 1971.

Cyclic AMP has the following chemical structure:

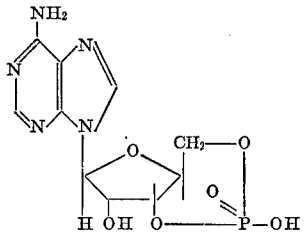

Psoriasis is a common, chronic, relapsing disease of unknown etiology which consists of elevated, silvery, dry lesions which are known as plaques. Pathologically, there are three obvious changes associated with the disease: (1) increase in the rate of cell division of the epidermis, (2) striking increase in the thickness of the cornified epithelium, and (3) proliferation of the subepithelial capillaries.

Current therapy consists mostly of topical agents containing coal tars and steroids. Ultraviolet irradiation is used. Occasionally, psoriasis is such a serious problem that systemic antimetabolites are employed to help control the epithelial proliferation, e.g. U.S. Pat. No. 3,749,784.

SUMMARY OF THE INVENTION

It has now been discovered that certain derivatives of cyclic 3',5'-adenosine monophosphate, when combined with a suitable pharmaceutical carrier and preferably a topical pharmaceutical carrier, temporarily alleviates the symptoms of psoriasis, that is, improves the appearance of psoriatic skin by reducing the size and discoloration of psoriatic plaques. The derivatives of cyclic 3',5'-adenosine monophosphate which may be used in the present invention are those compounds having the structural formula:

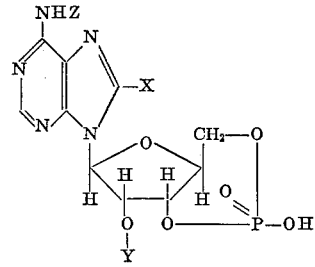

where
Y is H or butyryl;
Z is H or butyryl; and
X is H or —Br or —$SCH_3$ or —$NH_2$ or —SH or —OH;
and not all of X, Y and Z are H.

DETAILED DESCRIPTION OF THE INVENTION

Derivatives of cyclic 3',5'-adenosine monophosphate which may be used in the present invention include those having the structural formula:

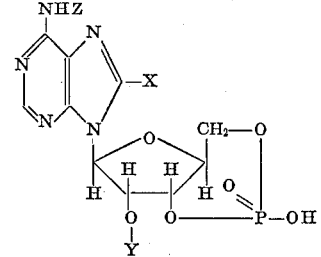

where
Y is H or butyryl;
Z is H or butyryl; and
X is H or —BR or —$SCH_3$ or —$NH_2$ or —SH or —OH;
and not all of X, Y and Z are H.

Examples of derivatives of cyclic 3',5'-adenosine monophosphate (cAMP) coming within the scope of the foregoing formula are the following:

1. $N^6$,2'O-dibutyryl-cAMP
2. $N^6$-monobutyryl-8-bromo-cAMP
3. 2'O-monobutyryl-8-thio-cAMP
4. 8-bromo-cAMP
5. 8-$SCH_2$-cAMP
6. $N^6$-monobutyryl-8-thio-cAMP
7. 2'O-monobutyryl-8-bromo-cAMP
8. $N^6$,2'O-dibutyryl-8-thio-cAMP The preferred cAMP derivatives include the $N^6,2'O$-dibutyryl-cAMP, 8-bromo-cAMP, $8\text{-}SCH_3\text{-}cAMP$ and $N^6,2'O$-dibutyryl8-thio-cAMP.

For topical administration a compound represented by the above formula, in the form of its pharmaceutically acceptable addition salt, such as $Na^+$, $K^+$, $Ca^{++}$, $Mg^{++}$, $Li^+$ etc. is formulated in an ointment or in a solution.

A typical oinment for topical use contains the following ingredients per gram of ointment.

|  | Mg. |
|---|---|
| 8-bromo cyclic AMP (sodium salt) | 10 |
| Isopropyl myristate | 30 |
| Polawax [1] | 130 |
| Mineral oil | 130 |
| Sodium phosphate dibasic | 4 |
| Sodium phosphate monobasic | 6 |
| Purified water q.s. ad. | 1000 |

Other conventional topical formulations may also be used. That is, the Polawax, a non-ionic emulsifying wax, may be replaced by fatty alcohols, glycol ethers of fatty acids, glycol esters of fatty acids, other wax-like emulsifiers or self-emulsifying fatty alcohol blends. The isopropyl myristate, which is used as an emollient, may be replaced with other isopropyl esters of fatty acids, butyl esters of fatty acids, glycerin, propylene glycol, alcohols, dimethyl sulfoxide, dimethyl formamide, propylene glycol carbonate and other carboxylic acid esters. The mineral oil, which is used to provide an oil phase, may be replaced by petroleum oil, oil extracts from animal sources, e.g. shark oil, lanolin and oil extracts from vegetable sources, e.g. peanut oil. The formulation may also include stabilizers including, for example, EDTA, 8-OH quinoline and conventional antioxidants and preservatives. The formulation may also include agents, such as urea, to improve the hydration of the skin in order to enhance "cosmetic feel" and adsorption of the cyclic AMP derivatives and conventional phosphodiesterase inhibitors, e.g. theophylline, to prevent breakdown of the cyclic AMP derivative.

A typical solution for topical use contains the following ingredients per gram:

|  | Mg. |
|---|---|
| $N^6$-monobutyryl-8-thio cyclic AMP (sodium salt) | 10 |
| Purified water | 100 |
| Glycerin (U.S.P.) | 890 |

For oral administration, the active ingredients can be formulated in tablets or gelatin capsules or in solution or in suspension in aqueous media. A typical tablet prepared in a conventional manner contains the following ingredients:

|  | Mg. |
|---|---|
| $N^6,2'O$-dibutyryl - 8 - thio cyclic AMP (sodium salt) | 50 |
| Lactose | 600 |
| Starch powder | 100 |
| Colloidal silica | 10 |
| Stearic acid | 40 |
| Microcrystalline cellulose | 300 |
|  | 1000 |

Suitable empty, telescoping gelatin capsules for oral administration can each contain from 1–50 mg. of active ingredient and 500 mg. of lactose or other pharmaceutically acceptable excipient thoroughly mixed.

Parenteral administration is accomplished with, for example, 1–10 mg. 8-bromo cyclic AMP and 10 mg. of dextrose per ampoule mixed with a diluting solution containing 90 mg. of sodium chloride in 10 ml. of sterile water or water for injection. Alternatively, sterile, injectable normal saline solution can be added to the ampoule contents immediately prior to use.

---
[1] Polawax: non-ionic emulsifying wax.

In carrying out the novel method employing the topical route, the active ingredient formulated as an ointment or solution, as indicated above, is applied to a psoriatic lesion at a rate varying from 0.2 mg. square cm. of skin surface per day up to 10 mg. per square cm. of skin surface per day until the appearance of the psoriatic skin has returned to normal. The ointment or solution is generally applied for five days, preferably using a continuous occlusive dressing. The concentration of active ingredient can vary from about 0.1% to about 5% by weight. With the foregoing concentration, a dose of 0.2 ml. per square cm. of skin surface readily supplies the amount of active ingredient specified above.

To illustrate the manner in which the invention is made, the following examples are given. It is understood, however, that the examples are for purposes of illustration and the invention is not to be regarded as limited to any of the specific materials or conditions therein.

EXAMPLE I

Three topical formulations were prepared as follows:

| Formulation (100 g.) | A | B | C |
|---|---|---|---|
| Isopropyl myristate | 3 | 3 | 3 |
| Polawax | 13 | 13 | 13 |
| Mineral oil | 13 | 13 | 13 |
| Sodium phosphate dibasic | 0.4 | 0.4 | 0.4 |
| Sodium phosphate monobasic | 0.6 | 0.6 | 0.6 |
| $N^6,2'O$-dibutyryl cyclic AMP | | 0.5 | 1.0 |
| Purified water q.s. ad | 100 | 100 | 100 |

The formulation was made by placing the isopropyl myristate, Polawax and mineral oil in a container and heating the container on a water bath at 39° C. 55 cc. of purified water was heated to boiling. The heated oil phase was added to the boiling water with vigorous mixing in a mechanical mixer. The emulsion was then allowed to cool to ambient temperature while mixing. The phosphates were then dissolved in 14 cc. of purified water. The active ingredient was then admixed with the phosphate solution. To the latter mixture is added the emulsion in 10 g. portions, mixing thoroughly between additions. The final product was then passed through an ointment mill.

Three psoriatic patients were selected having stable, small nummular psoriatic plaques. Plaques of equivalent size and severity with regard to infiltration, scaling and redness were numbered 1–3. Area 1 on each of the patients was treated daily for one week with formulation A; areas 2 and 3 were treated similarly with formulations B and C, respectively. All areas were occluded with Saran Wrap. Further, the tests were conducted on a double-blind basis, that is, neither the patient nor the clinician interpreting the data knew the contents of the formulations.

The clinician reported that formulation A (placebo) was inactive, formulation B (0.5% $N^6,2'O$-dibutyryl cyclic AMP) had weak anti-psoriatic activity and formulation C (1.0% $N^6,2'O$-dibutyryl cyclic AMP) had potent anti-psoriatic activity equivalent to that of a potent steroid under occlusion.

EXAMPLE II

Example I was repeated, except 4 patients and five formulations were used. The formulations used were the same as those used in Example I–A, except the following active ingredients were used:

|  | Percent | | | | |
|---|---|---|---|---|---|
| Active compound | A | B | C | D | E |
| 8-methylthio cyclic AMP | 1 | | | | |
| 8-bromo cyclic AMP | | 1 | | | |
| 8-thio cyclic AMP | | | 1 | | |
| Cyclic AMP | | | | | 1 |

The same procedure was used to treat the patients as used in Example I, except the plaques were treated twice daily.

The clinician reported that formulation A (placebo) was inactive in 3 of the 4 patients; formulation B (1% 8-methylthio cyclic AMP) was active in 3 of the 4 patients; formulation C (1% 8-bromo cyclic AMP) was strongly active in all 4 patients, that is, equivalent to the effect expected to be obtained with a fluorinated steroid under the same conditions; formulation D (1% 8-thio cyclic AMP) was weakly active in 2 of the 4 patients; formulation E (1% cyclic AMP) was weakly active in 2 of the 4 patients.

What is claimed is:

1. A method for treating psoriasis in humans comprising the administration to a human suffering from psoriasis of an effective dose for treating psoriasis of a compound of the formula

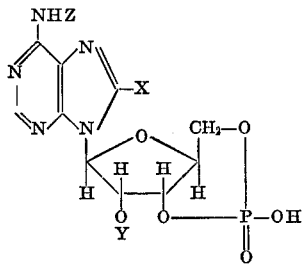

where Y and Z are each selected from the group consisting of H or butyryl and X is selected from the group consisting of H, —Br, —SCH$_3$, —SH, —OH and —NH$_2$, or a pharmaceutically acceptable addition salt thereof, provided that X, Y and Z are not all H, in a suitable pharmaceutical carrier.

2. The method of claim 1 wherein the compound is administered topically to a psoriatic lesion.

3. The method of claim 1 wherein the compound is administered to the psoriatic lesion intralesionally.

4. The method of claim 1 wherein Y and Z are each butyryl.

5. The method of claim 1 wherein Y is butyryl and Z is H.

6. The method of claim 1 wherein Z is butyryl and Y is H.

7. The method of claim 1 wherein X is —Br.

8. The method of claim 4 wherein X is —Br.

9. The method of claim 4 wherein X is —SH.

References Cited
UNITED STATES PATENTS 3,627,753    12/1971    Posternak et al.    260—211.5 R
3,712,885    1/1973    Weimann et al.    260—211.5 R HENRY A. FRENCH, Primary Examiner

UNITED STATES PATENT OFFICE
CERTIFICATE OF CORRECTION

Patent No. 3,849,553                   Dated November 19, 1974

Inventor(s) Frank J. Dea and Eric L. Nelson

It is certified that error appears in the above-identified patent and that said Letters Patent are hereby corrected as shown below:

At Column 1, line 59: "Robinson" should be —Robison— .

At Column 2, line 68: "8-SCH$_2$-cAMP" should be — 8-SCH$_3$-cAMP —

At Column 3, line 3, "N$^6$,2'O-dibutyryl8-thio-cAMP" should be
— N$^6$,2'O-dibutyryl-8-thio-cAMP —

Signed and Sealed this

Twenty-sixth Day of April 1977

[SEAL]

Attest:

RUTH C. MASON
Attesting Officer

C. MARSHALL DANN
Commissioner of Patents and Trademarks

Notice of Adverse Decision in Interference

In Interference No. 99,708, involving Patent No. 3,849,553, F. J. Dea and E. L. Nelson, CYCLIC NUCLEOTIDE THERAPEUTIC PREPARATION, final judgment adverse to the patentees was rendered Apr. 11, 1979, as to claim 3.

[*Official Gazette September 4, 1979.*]